United States Patent
Lin et al.

(10) Patent No.: US 12,546,727 B2
(45) Date of Patent: Feb. 10, 2026

(54) CALIBRATION OF PARAMETRIC MEASUREMENT MODELS BASED ON IN-LINE WAFER MEASUREMENT DATA

(71) Applicant: KLA Corporation, Milpitas, CA (US)

(72) Inventors: Brian C. Lin, Zhubei (TW); David Wu, Zhubei (TW); Song Wu, Shanghai (CN); Tianrong Zhan, Shanghai (CN); Emily Chiu, Zhubei (TW); Andrew Lagodzinski, Livermore, CA (US)

(73) Assignee: KLA Corporation, Milpitas, CA (US)

( * ) Notice: Subject to any disclaimer, the term of this patent is extended or adjusted under 35 U.S.C. 154(b) by 113 days.

(21) Appl. No.: 18/244,749

(22) Filed: Sep. 11, 2023

(65) Prior Publication Data

US 2024/0102941 A1    Mar. 28, 2024

Related U.S. Application Data (60) Provisional application No. 63/409,842, filed on Sep. 26, 2022.

(51) Int. Cl.
*G01N 21/95*    (2006.01)
*G01N 21/31*    (2006.01)
*G01N 21/47*    (2006.01)

(52) U.S. Cl.
CPC ......... *G01N 21/9505* (2013.01); *G01N 21/31* (2013.01); *G01N 21/4738* (2013.01); *G01N 2201/127* (2013.01)

(58) Field of Classification Search
CPC ............... G01N 21/9505; G01N 21/31; G01N 21/4738; G01N 2201/127; G01N 21/93;
(Continued)

(56) References Cited

U.S. PATENT DOCUMENTS

| 5,608,526 A | 3/1997 | Piwonka-Corle et al. |
| 5,859,424 A | 1/1999 | Norton et al. |

(Continued)

FOREIGN PATENT DOCUMENTS

| CN | 107408519 A | 11/2017 |
| CN | 113677983 A | 11/2021 |
| TW | 201502461 A | 1/2015 |

OTHER PUBLICATIONS

International Search Report mailed on Jan. 8, 2024, for PCT Application No. PCT/US2023/033132 filed on Sep. 19, 2023 by KLA Corporation, 3 pages.

(Continued)

*Primary Examiner* — Jamil Ahmed
*Assistant Examiner* — Roberto Fabian, Jr.
(74) *Attorney, Agent, or Firm* — Spano law group (57) ABSTRACT

Methods and systems for calibrating simulated measurement signals generated by a parametric measurement model are described herein. Regression on real measurement signals is performed using a parametric model. The residual fitting error between the real measurement signals and simulated measurement signals generated by the parametric model characterizes the error of the parametric model at each set of estimated values of the one or more floating parameters. Simulated measurement signals are generated by the parametric model at specified values of the floating parameters. A residual fitting error associated with the simulated measurement signals generated at the specified values of the floating parameters is derived from the residual fitting errors calculated by the regression on the real measurement signals. The simulated measurement signals are calibrated by adding the residual fitting error to the uncalibrated, simulated measurement signals. The calibrated, simulated mea- (Continued)

surement signals improve the accuracy of measurements and measurement recipe development.

20 Claims, 5 Drawing Sheets

(58) Field of Classification Search
CPC ......... G01N 21/9501; G01N 2021/213; G01N 21/274; G01B 11/02; G03F 7/706839
See application file for complete search history.

(56) References Cited

U.S. PATENT DOCUMENTS

| | | | |
|---|---|---|---|
| 6,023,338 | A | 2/2000 | Bareket |
| 6,429,943 | B1 | 8/2002 | Opsal et al. |
| 6,716,646 | B1 | 4/2004 | Wright et al. |
| 6,778,275 | B2 | 8/2004 | Bowes |
| 6,787,773 | B1 | 9/2004 | Lee |
| 6,992,764 | B1 | 1/2006 | Yang et al. |
| 7,242,477 | B2 | 7/2007 | Mieher et al. |
| 7,321,426 | B1 | 1/2008 | Poslavsky et al. |
| 7,406,153 | B2 | 7/2008 | Berman |
| 7,478,019 | B2 | 1/2009 | Zangooie et al. |
| 7,626,702 | B2 | 12/2009 | Ausschnitt et al. |
| 7,656,528 | B2 | 2/2010 | Abdulhalim et al. |
| 7,826,071 | B2 | 11/2010 | Shchegrov et al. |
| 7,842,933 | B2 | 11/2010 | Shur et al. |
| 7,873,585 | B2 | 1/2011 | Izikson |
| 7,929,667 | B1 | 4/2011 | Zhuang et al. |
| 7,933,026 | B2 | 4/2011 | Opsal et al. |
| 8,068,662 | B2 | 11/2011 | Zhang et al. |
| 8,138,498 | B2 | 3/2012 | Ghinovker |
| 9,291,554 | B2 | 3/2016 | Kuznetsov et al. |
| 9,826,614 | B1 | 11/2017 | Bakeman et al. |
| 9,857,291 | B2 | 1/2018 | Kwak et al. |
| 9,885,962 | B2 | 2/2018 | Veldman et al. |
| 9,915,522 | B1 | 3/2018 | Jiang et al. |
| 10,006,865 | B1 | 6/2018 | Shaughnessy et al. |
| 10,013,518 | B2 | 7/2018 | Bakeman et al. |
| 10,101,670 | B2 | 10/2018 | Pandev et al. |
| 10,152,678 | B2 | 12/2018 | Pandev et al. |
| 10,295,329 | B2 * | 5/2019 | Brill ..................... G01B 11/02 |
| 10,302,414 | B2 | 5/2019 | Wainreb |
| 10,324,050 | B2 | 6/2019 | Hench et al. |
| 10,345,721 | B1 | 7/2019 | Cao et al. |
| 10,352,695 | B2 | 7/2019 | Dziura et al. |
| 10,545,104 | B2 | 1/2020 | Hench et al. |
| 10,605,722 | B2 | 3/2020 | Kwak et al. |
| 10,775,323 | B2 | 9/2020 | Gellineau et al. |

| | | | |
|---|---|---|---|
| 2003/0021465 | A1 | 1/2003 | Adel et al. |
| 2004/0073398 | A1 | 4/2004 | Nikoonahad et al. |
| 2007/0176128 | A1 | 8/2007 | Van Bilsen et al. |
| 2007/0221842 | A1 | 9/2007 | Morokuma et al. |
| 2009/0152463 | A1 | 6/2009 | Toyoda et al. |
| 2011/0080585 | A1 | 4/2011 | Rabello et al. |
| 2011/0266440 | A1 | 11/2011 | Boughorbel et al. |
| 2012/0292502 | A1 | 11/2012 | Langer et al. |
| 2013/0208279 | A1 | 8/2013 | Smith |
| 2013/0304424 | A1 | 11/2013 | Bakeman et al. |
| 2014/0019097 | A1 | 1/2014 | Bakeman et al. |
| 2014/0064445 | A1 | 3/2014 | Adler |
| 2014/0111791 | A1 | 4/2014 | Manassen et al. |
| 2014/0172394 | A1 | 6/2014 | Kuznetsov et al. |
| 2014/0195194 | A1 | 7/2014 | Boaz et al. |
| 2014/0222380 | A1 | 8/2014 | Kuznetsov et al. |
| 2014/0297211 | A1 | 10/2014 | Pandev et al. |
| 2015/0046121 | A1 | 2/2015 | Dziura et al. |
| 2015/0110249 | A1 | 4/2015 | Bakeman et al. |
| 2015/0117610 | A1 | 4/2015 | Veldman et al. |
| 2015/0134286 | A1 * | 5/2015 | Chao .................. G01B 11/0625 702/81 |
| 2015/0204664 | A1 | 7/2015 | Bringoltz et al. |
| 2015/0285749 | A1 | 10/2015 | Moncton et al. |
| 2015/0300965 | A1 | 10/2015 | Sezginer et al. |
| 2016/0202193 | A1 | 7/2016 | Hench et al. |
| 2016/0282105 | A1 | 9/2016 | Pandev |
| 2016/0320319 | A1 | 11/2016 | Hench et al. |
| 2017/0023491 | A1 | 1/2017 | Cao et al. |
| 2017/0127983 | A1 * | 5/2017 | Spegazzini .......... A61B 5/1495 |
| 2017/0167862 | A1 | 6/2017 | Dziura et al. |
| 2018/0100796 | A1 | 4/2018 | Kwak et al. |
| 2018/0106735 | A1 | 4/2018 | Gellineau et al. |
| 2018/0113084 | A1 | 4/2018 | Hench et al. |
| 2018/0232630 | A1 | 8/2018 | Chen et al. |
| 2018/0328868 | A1 | 11/2018 | Bykanov et al. |
| 2019/0017946 | A1 | 1/2019 | Wack et al. |
| 2019/0293578 | A1 | 9/2019 | Gellineau |
| 2020/0335406 | A1 | 10/2020 | Liman et al. |
| 2021/0072163 | A1 | 3/2021 | Simkhovich et al. |
| 2021/0207956 | A1 | 7/2021 | Shchegrov et al. |

OTHER PUBLICATIONS

Lemaillet, Germer, Kline et al., "Intercomparison between optical and x-ray scatterometry measurements of FinFET structures" by Proc. SPIE, v.8681, p. 86810Q (2013).

Kline et al., "X-ray scattering critical dimensional metrology using a compact x-ray source for next generation semiconductor devices," J. Micro/Nanolith. MEMS MOEMS 16(1), 014001 (Jan.-Mar. 2017).

* cited by examiner

CALIBRATION OF PARAMETRIC MEASUREMENT MODELS BASED ON IN-LINE WAFER MEASUREMENT DATA

CROSS REFERENCE TO RELATED APPLICATION

The present application for patent claims priority under 35 U.S.C. § 119 from U.S. provisional patent application Ser. No. 63/409,842, entitled "Methods for Calibrating the Error of Parametric Models in Simulated Synthetic Spectra Using Inline Wafers for Optical-Based Metrology," filed Sep. 26, 2022, the subject matter of which is incorporated herein by reference in its entirety.

TECHNICAL FIELD

The described embodiments relate to systems for wafer metrology, and more particularly to characterization and defect detection of semiconductor structures and materials.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Metrology techniques offer the potential for high throughput without the risk of sample destruction. A number of optical and x-ray based techniques including scatterometry, ellipsometry, and reflectometry implementations and associated analysis algorithms are commonly used to characterize critical dimensions, film thicknesses, composition and other parameters of nanoscale structures.

Many metrology techniques suitable for measuring semiconductor structures at high throughput are model-based. The metrology techniques are indirect methods of measuring physical properties of the specimen under inspection, i.e., the measured values cannot be used to directly determine the physical properties of the specimen. In these cases, the nominal measurement process consists of formulating a measurement model that estimates the measured values for a given measurement scenario. The measurement model characterizes the interaction of the specimen with the measurement system. The measurement model includes a parametric model of the structure under measurement parameterized by various geometric and material parameters, e.g., film thicknesses, critical dimensions, etc., and a model of the measurement system parameterized by various machine parameters, e.g., wavelengths, angles of incidence, polarization angles, etc.

Parametric models of structures under measurement include floating parameters and fixed parameters. The values of floating parameters vary during the measurement process, while the values of fixed parameters are held at constant, nominal values during the measurement process. In general, fixed parameters represent dimensions of structural features that do not vary significantly for a particular measurement application, while floating parameters represent dimensions of structural features that do vary significantly for a particular measurement application and have a significant effect on the magnitude of measurement signals, e.g., measured images, spectra, etc.

Parametric models of structures under measurement are employed directly in the measurement process. In some examples, an electromagnetic simulation engine operates on a parametric model of a structure under measurement to generate synthetic measurement data. In a model based measurement application, a regression process (e.g., ordinary least squares regression) is employed to identify specimen parameter values that minimize the differences between the synthetic measurement data and experimentally measured values. For measurement purposes, system parameters and some structural parameters are treated as known, fixed parameters and some structural parameters are treated as unknown, floating parameters. The floating parameters are resolved by an iterative process (e.g., regression) that produces the best fit between synthetic measurement data and experimentally measured values.

In addition, parametric models of structures under measurement are employed indirectly in the measurement process. Synthetic measurement data generated based on a parametric model of a structure under measurement is widely employed to simulate the variation of measurement signals for different fabrication process conditions. The determined sensitivities are employed, in turn, to characterize measurement capability and relevant measurement performance. In this manner, parametric models of structures under measurement are critical to the development of a particular measurement recipe for a measurement application.

As devices (e.g., logic and memory devices) move toward smaller nanometer-scale dimensions, characterization becomes more difficult. Devices incorporating complex three-dimensional geometry and materials with diverse physical properties contribute to characterization difficulty. As devices become more complex, and measurement requirements become more stringent, parametric models are becoming more complex and error prone. As such, parametric modeling errors are a significant limitation in measurement recipe development and measurement execution for complex measurement applications.

Parametric model errors include system errors and structure characterization errors. System errors include errors in the characterization of the hardware configuration of the measurement system, e.g., angle of incidence, azimuth angle, etc. To minimize these errors, system parameters are perturbed until a best match between synthetic measurement data and actual measurement data is realized. Structure characterization errors reflect a failure of the parametric model to sufficiently characterize the structure under measurement. For example, structural variations induced by real process conditions may not be captured by a particular parametric model.

Traditionally, the minimization of structure characterization errors is realized in the same manner as system errors, i.e., by perturbing a set of fixed structure parameters until a best match between synthetic measurement data and actual measurement data is realized. This requires identifying a set of fixed parameters of the parametric model and defining a range of perturbation values of the parameters that represents the actual structural variation induced by real fabrication process conditions.

Unfortunately, this approach is proving to be ineffective for increasingly complex parametric models. More specifically, it is increasingly difficult to both identify a set of fixed parameters to perturb and determine a range of perturbation values of the parameters that will accurately represent actual process variation.

Furthermore, the use of synthetic spectra to characterize measurement capability based on a measurement library, regression or both, is compromised by an inaccurate parametric model. More specifically, it is difficult to reproduce real measurement data using synthetically generated measurement data when parametric model errors are not properly calibrated.

Proper calibration of parametric modeling errors is emerging as a challenge in measurement recipe development and execution for complex measurement applications. Process and yield control in both the research and development and manufacturing environments demands improved calibration of parametric models to meet the requirements of the semiconductor manufacturing industry. Thus, methods and systems for improved calibration of parametric models are desired.

SUMMARY

Methods and systems for calibrating simulated measurement signals generated by a parametric measurement model are described herein. Real measurement signals are acquired from measurements of different instances of one or more structures fabricated on semiconductor wafers. In preferred embodiments, the semiconductor wafers are inline, production wafers that capture the structural variations induced by the actual fabrication process. A regression on the real measurement signals is performed using a parametric model for each set of real measurement signals. Each regression results in a set of estimated values of the floating parameters and a residual fitting error between the real measurement signals and the simulated measurement signals generated by the parametric model at the estimated values of the floating parameters. The residual error characterizes the remaining difference between the real measurement signals and the simulated measurement signals. In this sense, the residual error characterizes the error of the parametric model at each set of estimated values of the one or more floating parameters Simulated measurement signals are generated by the parametric model at specified values of the floating parameters. A residual fitting error associated with the simulated measurement signals generated at the specified values of the floating parameters is derived from the residual fitting errors calculated by regression on the real measurement signals. The simulated measurement signals are calibrated by adding the residual fitting error associated with the specified values of the floating parameters to the values of the simulated measurement signals. In this manner, the calibrated, simulated measurement signals more accurately reproduce the expected values of real measurement signals associated with measurements of structures characterized by the specified values of the floating parameters.

In some embodiments, one or more sets of real measurement signals that most closely match the set of simulated measurement signals corresponding to the specified values of the one or more floating parameters are selected, and the residual error associated with the specified values of the one or more floating parameters is estimated based on the residual errors corresponding to the one or more selected sets of real measurement signals.

In some of these embodiments, the one or more sets of real measurement signals that most closely match the set of simulated measurement signals are selected based on a K-nearest neighbor search of the sets of real measurement signals. The K-nearest neighbor search identifies k different sets of real measurement signals that most closely match the set of simulated measurement signals under consideration.

In general, k, can be any positive integer value. In some embodiments, k equals one. In these examples, the simulated signals associated with the specified values of the one or more floating parameters are calibrated by adding the residual error associated with the selected set of real measurement signals to the simulated signals associated with the specified values of the one or more floating parameters. In some other embodiments, k is a positive integer value greater than one. In these examples, the simulated signals associated with the specified values of the one or more floating parameters are calibrated by adding the average residual error associated with the selected sets of real measurement signals to the simulated signals associated with the specified values of the one or more floating parameters.

In some other embodiments, the residual error associated with the specified values of the one or more floating parameters is estimated based on a statistical model of values of the real measurement signals. The statistical model is evaluated at the set of simulated measurement signals associated with the specified values of the one or more floating parameters to determine the residual error associated with the specified values of the one or more floating parameters.

In a further aspect, a variation of values of each of the one or more floating parameters of the parametric measurement model is determined across the sets of estimated values of the one or more floating parameters of the parametric measurement model. In this manner, the variation range of geometric profiles of the structure(s) under measurement is estimated based on the real measurements of the instances of the one or more structures on in-line, production wafers.

In a further aspect, an expanded set of values of each of the one or more floating parameters is generated based on the determined variations. Each expanded set of values is larger than the corresponding set of estimated values. In these embodiments, the variation of values of the geometric profile parameters estimated based on real measurements is employed to determine the range of structure variation spanned by the specified values of the floating parameters.

In another further aspect, an expanded set of simulated measurement signals is generated by evaluating the parametric measurement model at each of the values of the expanded set of values of each of the one or more floating parameters. In some embodiments, calibrated, simulated measurement signals are employed to generate an expanded measurement library.

The foregoing is a summary and thus contains, by necessity, simplifications, generalizations, and omissions of detail. Consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for estimating parametric model errors and calibrating simulated measurement signals generated by the parametric models are described herein. Real measurement signals are acquired from measurements of different instances of one or more structures fabricated on semiconductor wafers. In preferred embodiments, the semiconductor wafers are inline, production wafers that capture the structural variations induced by the actual fabrication process. For each set of real measurement signals, i.e., each measurement instance, a regression on the real measurement signals is performed using a parametric model. Floating parameters of the parametric model are treated as the regression parameters. Each regression results in a set of estimated values of the floating parameters and a residual fitting error between the real measurement signals and the simulated measurement signals generated by the parametric model at the estimated values of the floating parameters.

Simulated measurement signals are generated by the parametric model at specified values of the floating parameters. Parametric model errors embedded in the simulated measurement signals are estimated as a residual fitting error associated with the specified values of the floating parameters. The residual fitting error is derived from the residual fitting errors calculated during the regression on the real measurement signals.

The simulated measurement signals are calibrated by adding the residual fitting error associated with the specified values of the floating parameters to the values of the simulated measurement signals. In this manner, the calibrated, simulated measurement signals more accurately reproduce the expected values of real measurement signals associated with measurements of structures characterized by the specified values of the floating parameters. In some examples, the calibrated, simulated measurement signals more accurately reproduce the variation of measurement signals arising from measurements of actual wafers. Calibrated, simulated measurement signals as described herein can improve the performance of model based measurements, measurement recipe development, or both.

Figure 1:
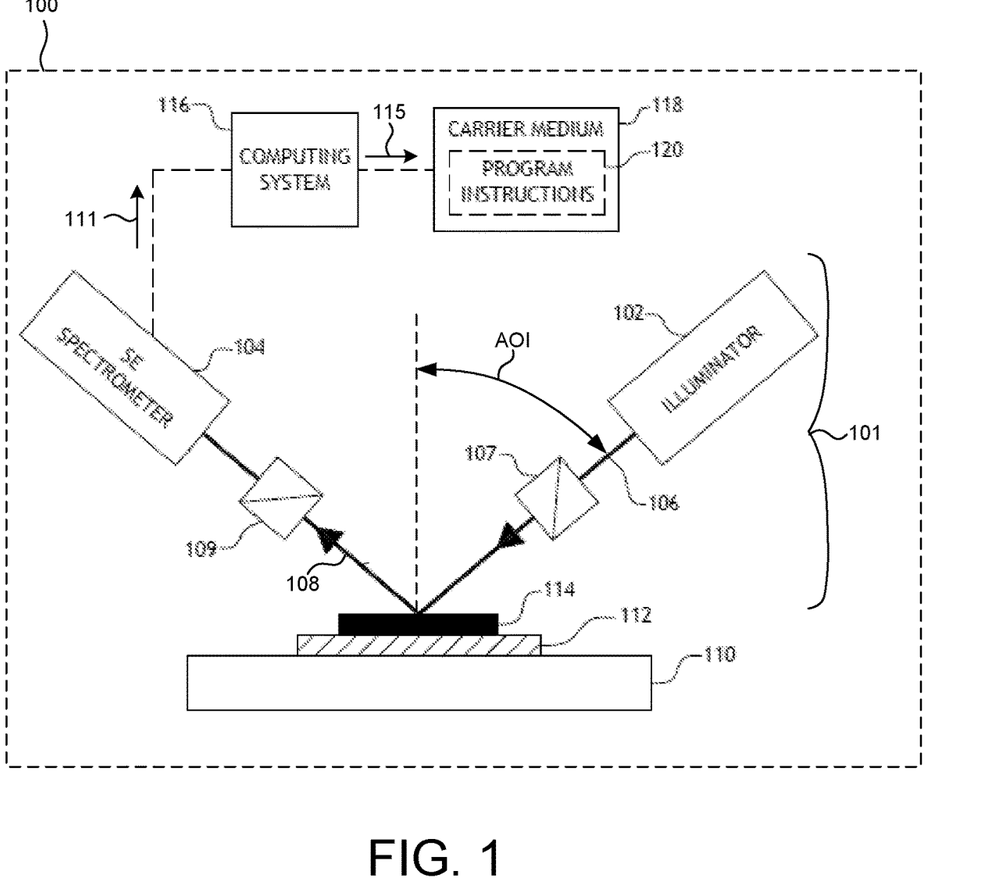
FIG. 1 is a simplified diagram illustrative of a metrology system 100 operable in accordance with the methods of calibration of simulated measurement signals as described herein.

FIG. 1 illustrates a metrology system 100 for measuring characteristics of a semiconductor wafer in accordance with the exemplary methods presented herein. As shown in FIG. 1, the system 100 may be used to perform spectroscopic ellipsometry measurements of one or more structures 114 of a semiconductor wafer 112 disposed on a wafer positioning system 110. In this aspect, the system 100 may include a spectroscopic ellipsometer (SE) 101 equipped with an illuminator 102 and a spectrometer 104. The illuminator 102 of the system 100 is configured to generate and direct illumination of a selected wavelength range (e.g., 150-850 nm, 190-850 nm, 240-850 nm, etc.) to the structure 114 disposed on the surface of the semiconductor wafer 112. In turn, the spectrometer 104 is configured to receive illumination reflected from the surface of the semiconductor wafer 112. It is further noted that the light emerging from the illuminator 102 is polarized using a polarization state generator 107 to produce a polarized illumination beam 106. The radiation reflected by the structure 114 disposed on the wafer 112 is passed through a polarization state analyzer 109 and to the spectrometer 104. The radiation received by the spectrometer 104 in the collection beam 108 is analyzed with regard to polarization state, allowing for spectral analysis by the spectrometer of radiation passed by the analyzer. The measured spectra 111 are communicated to the computing system 116 for analysis of the structure 114.

In a further embodiment, the metrology system 100 is a measurement system 100 that may include one or more computing systems 116 employed to perform calibration of simulated measurement signals in accordance with the methods described herein. The one or more computing systems 116 may be communicatively coupled to the spectrometer 104. In one aspect, the one or more computing systems 116 are configured to receive measurement data 111 associated with a measurement of the structure 114 of specimen 112. In one example, the measurement data 111 includes an indication of the measured spectral response of the specimen by target measurement system 100 based on the one or more sampling processes from the spectrometer 104.

It should be recognized that the various elements described throughout the present disclosure may be carried out by a single computer system 116 or, alternatively, a multiple computer system 116. Moreover, different subsystems of the system 100, such as the spectroscopic ellipsometer 101, may include a computer system suitable for carrying out at least a portion of the steps described herein. Therefore, the aforementioned description should not be interpreted as a limitation on the present invention but merely an illustration. Further, the one or more computing systems 116 may be configured to perform any other step(s) of any of the method embodiments described herein. Moreover, some or all of the one or more computing systems 116 may be located remotely from the site of wafer measurement. For example, elements of computing system 116 configured to perform any of the calibration blocks described herein may be located at another facility remotely located from the site of where the wafer is measured.

In this regard, there is no requirement that spectral acquisition and subsequent analysis of the spectral data need be contemporaneous or performed in spatial proximity. For instance, spectral data may be stored in memory for analysis at a later time. In another instance, spectral results may be obtained and transmitted to a computing system located at a remote location for analysis.

In addition, the computer system 116 may be communicatively coupled to the spectrometer 104 and the illuminator subsystem 102 of the ellipsometer 101 in any manner known in the art. For example, the one or more computing systems 116 may be coupled to a computing system of the spectrometer 104 of the ellipsometer 101 and a computing system of the illuminator subsystem 102. In another example, the spectrometer 104 and the illuminator 102 may be controlled by a single computer system. In this manner, the computer system 116 of the system 100 may be coupled to a single ellipsometer computer system.

The computer system 116 of the system 100 may be configured to receive and/or acquire data or information from the subsystems of the system (e.g., spectrometer 104, illuminator 102, and the like) by a transmission medium that may include wireline and/or wireless portions. In this manner, the transmission medium may serve as a data link between the computer system 116 and other subsystems of the system 100. Further, the computing system 116 may be configured to receive measurement data via a storage medium (i.e., memory). For instance, the spectral results obtained using a spectrometer of ellipsometer 101 may be stored in a permanent or semi-permanent memory device (not shown). In this regard, the spectral results may be imported from an external system.

Moreover, the computer system 116 may send data to external systems via a transmission medium. The computer system 116 of the system 100 may be configured to receive and/or acquire data or information from other systems (e.g., inspection results from an inspection system or metrology results from a metrology system) by a transmission medium that may include wireline and/or wireless portions. In this manner, the transmission medium may serve as a data link between the computer system 116 and other subsystems of the system 100. Moreover, the computer system 116 may send data to external systems via a transmission medium.

The computing system 116 may include, but is not limited to, a personal computer system, mainframe computer system, workstation, cloud based computing system, image computer, parallel processor, or any other device known in the art. In general, the term "computing system" may be broadly defined to encompass any device having one or more processors, which execute instructions from a memory medium.

Program instructions 120 implementing methods such as those described herein may be transmitted over or stored on carrier medium 118. The carrier medium may be a transmission medium such as a wire, cable, or wireless transmission link. The carrier medium may also include a computer-readable medium such as a read-only memory, a random access memory, a solid-state memory, a magnetic or optical disk, or a magnetic tape.

The embodiments of the system 100 illustrated in FIG. 1 may be further configured as described herein. In addition, the system 100 may be configured to perform any other block(s) of any of the method embodiment(s) described herein.

As illustrated in FIG. 1, a beam of broadband radiation from illuminator 102 is linearly polarized in polarization state generator 107, and the linearly polarized beam is then incident on specimen 112. After reflection from specimen 112, the beam propagates toward polarization state analyzer 109 with a changed polarization state. In some examples, the reflected beam has elliptical polarization. The reflected beam propagates through polarization state analyzer 109 into spectrometer 104. In spectrometer 104, the beam components having different wavelengths are refracted (e.g., in a prism spectrometer) or diffracted (e.g., in a grating spectrometer) in different directions to different detectors. The detectors may be a linear array of photodiodes, with each photodiode measuring radiation in a different wavelength range.

In one example, computing system 116 receives the measured data (e.g., raw measurement data) from each detector, and is programmed with software for processing the data it receives in an appropriate manner. The measured spectral response of a specimen may be determined by analyzing the changes in polarization of radiation reflected from the sample in response to incident radiation having known polarization state in any number of ways known in the art.

Any of polarization state generator 107 and polarization state analyzer 109 may be configured to rotate about their optical axis during a measurement operation. In some examples, computing system 116 is programmed to generate control signals to control the angular orientation of polarization state generator 107 and/or polarization state analyzer 109, or other elements of the system 100 (e.g., wafer positioning system 110 upon which specimen 112 rests). Computing system 116 may also receive data indicative of the angular orientation of polarization state analyzer 109 from an analyzer position sensor associated with polarization state analyzer 109. Similarly, computing system 116 may also receive data indicative of the angular orientation of polarization state generator 107 from a polarizer position sensor associated with polarization state generator 107. Computing system 116 may be programmed with software for processing such orientation data in an appropriate manner.

In one embodiment, the polarization state generator 107 is a linear polarizer that is controlled so that it rotates at a constant speed, and the polarization state analyzer is a linear polarizer that is not rotating ("the analyzer"). The signal received at each detector of spectrometer 104 (i.e., the raw measurement data) will be a time-varying intensity illustrated by Equation (1), $$I(t) = I_0[1 + \alpha \cos(2\omega t - P_0) + \beta \sin(2\omega t - P_0)] \quad (1)$$

where $I_0$ is a constant that depends on the intensity of radiation emitted by illuminator 102, $\omega$ is the angular velocity of polarization state generator 107, $P_0$ is the angle between the optical axis of polarization state generator 107 and the plane of incidence (e.g., the plane of FIG. 1) at an initial time (t=0), and $\alpha$ and $\beta$ are values defined as illustrated by Equations (2) and (3), $$\alpha = [\tan^2\Psi - \tan^2(A - A_0)]/[\tan^2\Psi + \tan^2(A - A_0)] \quad (2)$$

and $$\beta = [2(\tan\Psi)(\cos\Delta)(\tan(A - A_0))]/[\tan^2\Psi + \tan^2(A - A_0)] \quad (3)$$

where $\tan(\Psi)$ is the amplitude of the complex ratio of the p and s reflection coefficients of the sample and $\Delta$ is the phase of the complex ratio of the p and s reflection coefficients of the sample. The "p" component denotes the component of polarized radiation whose electrical field is in the plane of FIG. 1, and "s" denotes the component of polarized radiation whose electrical field is perpendicular to the plane of FIG. 1. A is the nominal analyzer angle (e.g., a measured value of the orientation angle supplied, for example, from the above-mentioned analyzer position sensor associated with polarization state analyzer 109). $A_O$ is the offset of the actual orientation angle of polarization state analyzer 109 from the reading "A" (e.g., due to mechanical misalignment, $A_O$ may be non-zero).

In general, the spectral response of a specimen to a measurement is calculated by the metrology system based on functions of spectrometer data, S, and a subset of system parameter values, $P_{sys1}$, as illustrated by equations (4) and (5).

$$\alpha_{meas} = m(P_{sys1}, S) \tag{4}$$

$$\beta_{meas} = n(P_{sys1}, S) \tag{5}$$

The subset of system parameter values, $P_{sys1}$, are those system parameters needed to determine the spectral response of the specimen to the measurement performed by the metrology system.

For the embodiment described with reference to FIG. 1, the subset of system parameters includes the machine parameters of equations (1)-(3). Values of $\alpha_{meas}$ and $\beta_{meas}$ are determined based on a measurement of a particular specimen by metrology system 100 and a subset of system parameter values as described by equations (1)-(3).

In general, ellipsometry is an indirect method of measuring physical properties of the specimen under inspection. In most cases, the measured values (e.g., $\alpha_{meas}$ and $\beta_{meas}$) cannot be used to directly determine the physical properties of the specimen. The nominal measurement process consists of formulating a parametric measurement model that estimates the measured values (e.g., $\alpha_{meas}$ and $\beta_{meas}$) for a given measurement scenario. The measurement model characterizes the interaction of the specimen with the measurement system. The measurement model includes a parameterization of the structure (e.g., film thicknesses, critical dimensions, etc.) and the machine (e.g., wavelengths, angles of incidence, polarization angles, etc.). As illustrated in equations (6) and (7), the measurement model includes parameters associated with the machine ($P_{machine}$) and the specimen ($P_{specimen}$)

$$\alpha_{model} = f(P_{machine}, P_{specimen}) \tag{6}$$

$$\beta_{model} = g(P_{machine}, P_{specimen}) \tag{7}$$

Machine parameters are parameters used to characterize the metrology tool (e.g., ellipsometer 101), and may include some or all of the subset of system parameters described with reference to equations (4) and (5). Exemplary machine parameters include angle of incidence (AOI), analyzer angle ($A_O$), polarizer angle ($P_O$), illumination wavelength, numerical aperture (NA), etc.

Specimen parameters are parameters used to characterize the specimen (e.g., specimen 112 including structures 114). For a thin film specimen, exemplary specimen parameters include refractive index, dielectric function tensor, nominal layer thickness of all layers, layer sequence, etc. For measurement purposes, the machine parameters are treated as known, fixed parameters and some or all of the specimen parameters are treated as unknown, floating parameters. The floating parameters are resolved by an iterative process (e.g., regression) that produces the best fit between theoretical predictions and experimental data. The unknown specimen parameters, $P_{specimen}$, are varied and the model output values (e.g., ($\alpha_{model}$ and $\beta_{model}$) are calculated until a set of specimen parameter values are determined that results in a close match between the model output values and the experimentally measured values (e.g., $\alpha_{meas}$ and $\beta_{meas}$).

In a model based measurement application such as spectroscopic ellipsometry, a regression process (e.g., ordinary least squares regression) is employed to identify specimen parameter values that minimize the differences between the model output values and the experimentally measured values for a set of fixed values of the machine parameter values and a set of fixed values of any specimen parameters that are not treated as unknown, floating parameters.

In one aspect, methods and systems for calibrating the simulated measurement signals generated by a parametric measurement model are presented. In this manner, the calibrated, simulated measurement signals more accurately reproduce the expected values of real measurement signals associated with measurements of structures characterized by the specified values of the floating parameters. In the embodiment depicted in FIG. 1, computing system 116 is further configured to determine a value of at least one specimen parameter associated with a structure under measurement based on calibrated, simulated measurement signals.

In a further aspect, real measurement signals generated by a metrology system, e.g., metrology system 100, are received by a computing system, e.g., computing system 116. The real measurement signals are associated with measurements of each of a plurality of instances of one or more structures fabricated on one or more semiconductor wafers. Equation (8) illustrates real measurement signals, M, including n sets of measurement signals, $m_i$, where i is an index from one to n, where n is any positive, integer number. Each set of measurement signals corresponds to a measurement instance of one or more structures under measurement.

$$M = \{m_1, m_2, \ldots, m_n\} \tag{8}$$

In the embodiment depicted in FIG. 1, measurement signals 116 are real measurement signals, i.e., spectra, collected from different instances of one or more structures 114 fabricated on wafer 112. The one or more structures include a metrology target, device structure, proxy structure, etc. Different instances of one or more structures include repeated instances of the same nominal structure under measurement. In preferred embodiments, the real measurement signals are collected from in-line, production wafers that represent the actual variation of the process employed to fabricate the structures under measurement.

Furthermore, a set of estimated values of one or more floating parameters of a parametric measurement model associated with each of the measurements of the plurality of instances of the one or more structures is determined. Each set of estimated values is determined by a regression on the real measured data with a parametric measurement model that simulates the actual measurement. The values of the floating parameters of the parametric measurement model are resolved by regression to minimize the error function governing the regression. The error function characterizes the differences between the real measurement signals and the simulated measurement signals. Equation (9) illustrates simulated measurement signals, S, including n sets of simulated measurement signals, $s_i$, corresponding to the real measurement signals, $m_i$, illustrated in Equation (8). The values of the simulated measurement signals, S, are determined at the final iteration of the regression at the estimated values of the one or more floating parameters.

$$S=\{s_1, s_2, \ldots, s_n\} \quad (9)$$

At the termination of the regression, a residual error characterizes the remaining difference between the real measurement signals and the simulated measurement signals. In this sense, the residual error characterizes the error of the parametric model at each set of estimated values of the one or more floating parameters. Equation (10) illustrates residual error signals, R, including n sets of simulated measurement signals, $r_i$, corresponding to the real measurement signals, $m_i$, illustrated in Equation (8). As illustrated by Equation (11), each set of residual error signals, $r_i$, is calculated as the difference between the real measurement signals, $m_i$, and the corresponding simulated measurement signals, $s_i$.

$$R=\{r_1, r_2, \ldots, r_n\} \quad (10)$$

$$r_i=m_i-s_i \quad (11)$$

For example, the residual error associated with a spectral measurement is the difference between the real measurement signals and the simulated measurement signals at each wavelength, i.e., a residual error spectrum. In another example, the residual error associated with an image based measurement, e.g., a scatterometry image, is the difference between the real measurement signals and the simulated measurement signals at each pixel of the image, i.e., a residual error image.

Each set of real measurement signals, corresponding set of estimated values of one or more floating parameters, and corresponding residual error is stored in a memory, e.g., carrier medium 118. In preferred embodiments, the sets of real measurement signals, corresponding floating parameter values, and corresponding residual errors span the process variation space associated with the structure under measurement, and thus captures parametric model error information across the process space.

In a further aspect, sets of simulated measurement signals are determined by evaluating the parametric measurement model at different sets of specified values of the one or more floating parameters. The sets of simulated measurement signals are evaluated without calibration, and thus, include the errors inherent to the parametric measurement model. Equation (12) illustrates simulated measurement signals, T, including m sets of simulated measurement signals.

$$T=\{t_1, t_2, \ldots, t_m\} \quad (12)$$

In many examples, the specified values of the floating parameters are different from the estimated values of the floating parameters determined during regression on the measurement signals. However, in general, the specified values may be the same or different values from the estimated values of the floating parameters determined during regression on the measurement signals.

Furthermore, in many examples, the number of sets of specified values is much larger than the number of sets of real measurement signals, i.e., m is greater than n. In many examples, the sets of specified values are synthetically generated by a user of the metrology system to span the expected range of geometric profiles of the one or more structures under measurement with higher resolution than the available sets of real measurement signals. For example, the available sets of real measurement signals may number in the hundreds, while the sets of specified values may number in the thousands, or tens of thousands.

In a further aspect, a residual error associated with the specified values of the one or more floating parameters is determined based on the residual errors associated with each of the measurements of the plurality of instances of the one or more structures. Furthermore, each set of simulated measurement signals is calibrated by adding the residual error associated with the specified values of the floating parameters to the set of simulated measurement signals. The error associated with each set of simulated measurement signals, i.e., the error inherent to the parametric measurement model evaluated at each set of values of the floating parameters, is corrected based on residual errors derived from real measurements of in-line, production wafers. In this manner, the calibrated synthetic spectra more accurately reproduce the variation of real measurement signals.

The error associated with each set of specified values of the one or more floating parameters is illustrated by Equation (13).

$$E=\{e_1, e_2, \ldots, e_m\} \quad (13)$$

Each set of calibrated simulated measurement signals, $c_k$, is calculated as the sum of the uncalibrated simulated measurement signals, $t_k$, and the corresponding error, $e_k$, as illustrated by Equation (14), where k is an index from one to m, where m is any positive, integer number.

$$c_k=t_k+e_k \quad (14)$$

The resulting sets of calibrated, simulated measurement signals, C, are illustrated by Equation (15)

$$C=\{c_1, c_2, \ldots, c_m\} \quad (15)$$

In some embodiments, one or more sets of real measurement signals that most closely match the set of simulated measurement signals corresponding to the specified values of the one or more floating parameters are selected, and the residual error associated with the specified values of the one or more floating parameters is estimated based on the residual errors corresponding to the one or more selected sets of real measurement signals.

In some of these embodiments, the one or more sets of real measurement signals that most closely match the set of simulated measurement signals are selected based on a K-nearest neighbor search of the sets of real measurement signals, M. The K-nearest neighbor search of M identifies k different sets of real measurement signals that most closely match the set of simulated measurement signals under consideration. In general, k, can be any positive integer value. In some embodiments, k equals one. In these examples, the residual error associated with the selected set of real measurement signals is treated as the residual error associated with the specified values of the one or more floating parameters. In these examples, the simulated signals associated with the specified values of the one or more floating parameters are calibrated by adding the residual error associated with the selected set of real measurement signals to the simulated signals associated with the specified values of the one or more floating parameters. In some other embodiments, k is a positive integer value greater than one. In these examples, the residual errors associated with the selected sets of real measurement signals are averaged, and the average residual error is treated as the residual errors associated with the specified values of the one or more floating parameters. In these examples, the simulated signals associated with the specified values of the one or more floating parameters are calibrated by adding the average residual error associated with the selected sets of real measurement signals to the simulated signals associated with the specified values of the one or more floating parameters.

In some other embodiments, the residual error associated with the specified values of the one or more floating parameters is estimated based on a statistical model. In these embodiments, a statistical model of the residual errors characterizing the difference between each set of real measured signals and the corresponding set of simulated measurement signals is generated. The statistical model is a function of values of the real measurement signals.

In one example, a Gaussian model of the residual errors associated with the real measurement signals is generated. The Gaussian model specifies the values of the residual error across a range of values of the real measurement signals. For example, for spectral measurements, the Gaussian model specifies the values of the residual error across a range of values of a spectral signal, e.g., $\alpha$, for each wavelength. Equation (16) illustrates the Gaussian model in one example, where N is the Gaussian distribution of values of the residual error associated with spectral signal, $\alpha$, at wavelength, $\lambda$, $\mu$ is the mean value of the Gaussian distribution, N, and $\sigma$, is the standard deviation of the Gaussian distribution, N.

$$N(\mu, \sigma; \lambda, \alpha) \qquad (16)$$

For image based measurements, the Gaussian model specifies the values of the residual error across a range of values of measured intensity for each pixel.

The statistical model is evaluated at the set of simulated measurement signals associated with the specified values of the one or more floating parameters to determine the residual error associated with the specified values of the one or more floating parameters.

In a further aspect, a variation of values of each of the one or more floating parameters of the parametric measurement model is determined across the sets of estimated values of the one or more floating parameters of the parametric measurement model. In this manner, the variation range of geometric profiles of the structure(s) under measurement is estimated based on the real measurements of the instances of the one or more structures on in-line, production wafers.

In a further aspect, an expanded set of values of each of the one or more floating parameters is generated based on the determined variations. Each expanded set of values is larger than the corresponding set of estimated values. In these embodiments, the variation of values of the geometric profile parameters estimated based on real measurements is employed to determine the range of structure variation spanned by the specified values of the floating parameters.

In another further aspect, an expanded set of simulated measurement signals is generated by evaluating the parametric measurement model at each of the values of the expanded set of values of each of the one or more floating parameters.

Figure 2:
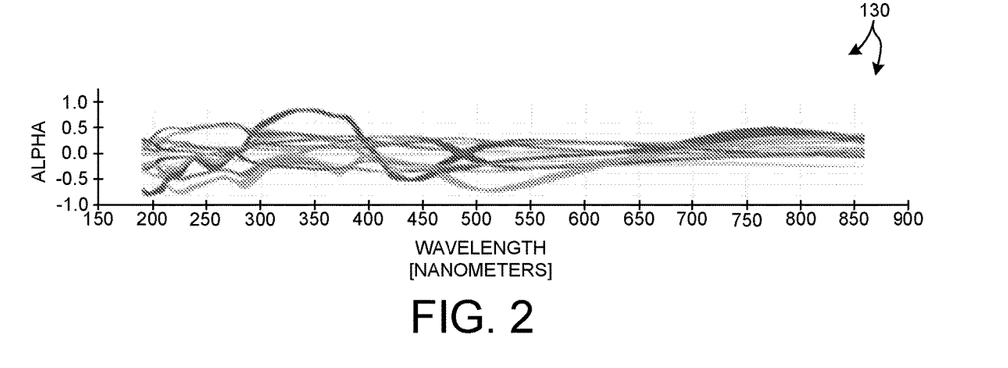
FIG. 2 is a plot 130 illustrative of the values of the measured spectral signal, α, for a number of different measurement instances of structures fabricated on inline, production wafers.

FIG. 2 is a plot 130 illustrative of the values of the measured spectral signal, $\alpha$, for a number of different measurement instances. The measured spectral signals are real measurement signals of structures fabricated on inline, production wafers.

Figure 3:
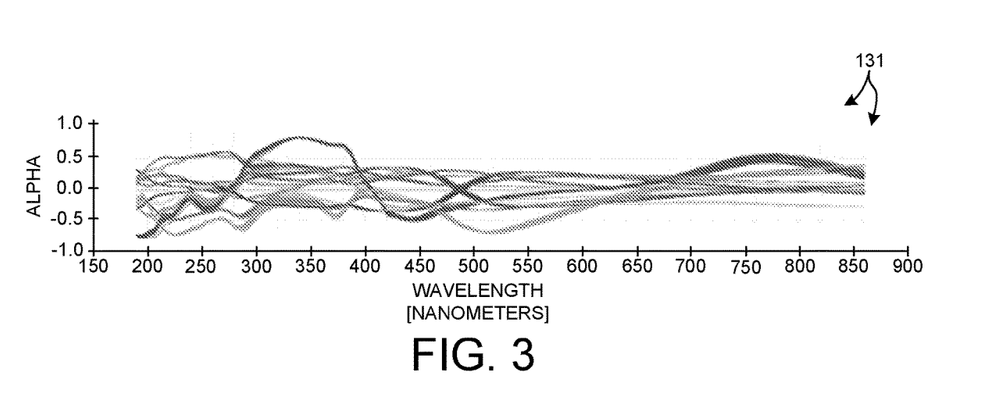
FIG. 3 is a plot 131 illustrative of the values of simulated spectral signals, α, after fitting to the real measurement signals depicted in FIG. 2.

FIG. 3 is a plot 131 illustrative of the values of simulated spectral signals, $\alpha$, after fitting to the real measurement signals depicted in FIG. 2.

Figure 4:
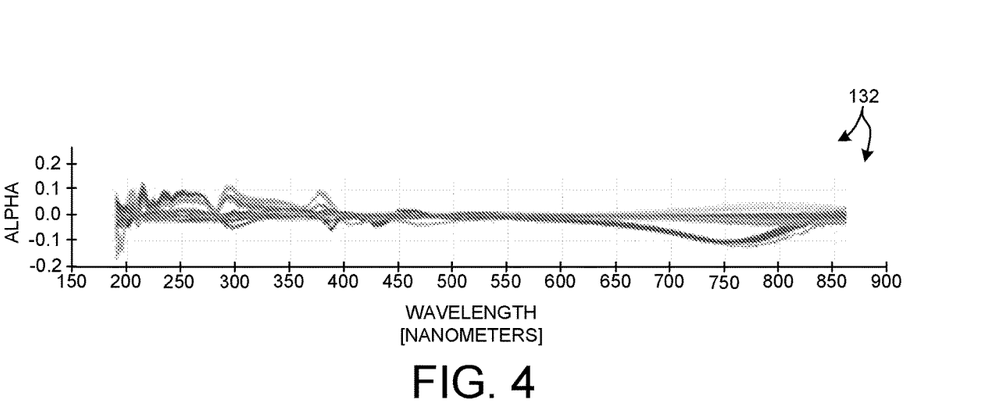
FIG. 4 is a plot 132 illustrative of the residual error associated with fitting of the values of the simulated spectral signals depicted in FIG. 3, to the real measurement signals depicted in FIG. 4.

FIG. 4 is a plot 132 illustrative of the residual error associated with fitting of the values of the simulated spectral signals depicted in FIG. 3, to the real measurement signals depicted in FIG. 4, i.e., the difference between the values of the simulated spectral signals and the real measurement signals.

Figure 5:
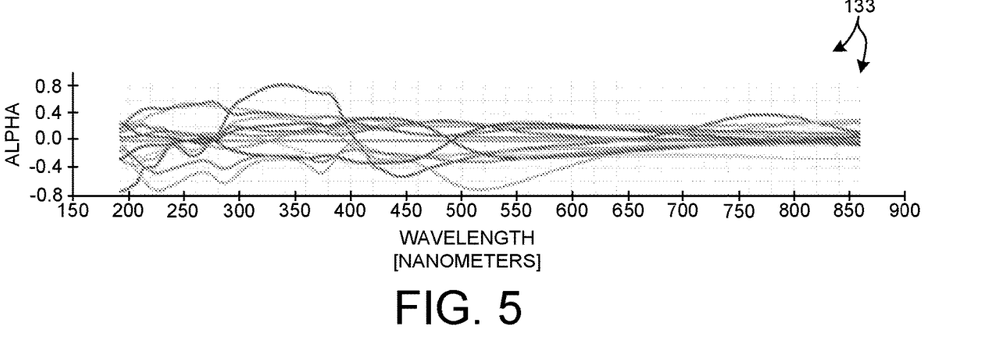
FIG. 5 is a plot 133 illustrative of the values of simulated spectral signal, α, associated with specified values of the floating parameters.

FIG. 5 is a plot 133 illustrative of the values of simulated spectral signal, $\alpha$, associated with specified values of the floating parameters.

Figure 6:
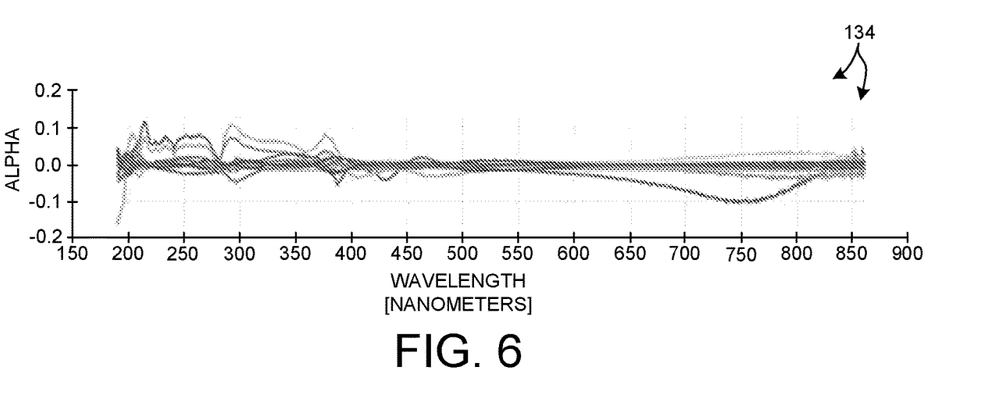
FIG. 6 is a plot 134 illustrative of the values of the residual error associated with the specified values of the floating parameters illustrated in FIG. 5.

FIG. 6 is a plot 134 illustrative of the values of the residual error associated with the specified values of the floating parameters illustrated in FIG. 5.

Figure 7:
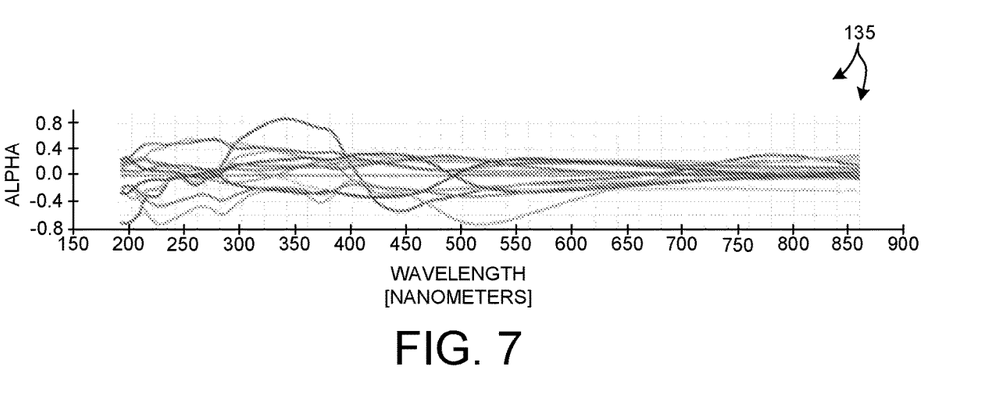
FIG. 7 is a plot 135 illustrative of the values of the calibrated, synthetic spectra associated with the specified values of the floating parameters illustrated in FIG. 5.

FIG. 7 is a plot 135 illustrative of the values of the calibrated, synthetic spectra associated with the specified values of the floating parameters illustrated in FIG. 5. The calibrated, synthetic spectra are generated as the sum of the uncalibrated, simulated spectral signals illustrated in FIG. 5 and the residual errors illustrated in FIG. 6. As depicted in FIG. 6, the residual errors across the wavelength range and all signal channels varies within a range of +/−0.1. These non-trivial errors are accounted for in the calibrated, synthetic spectra depicted in FIG. 7.

In some embodiments, calibrated, simulated measurement signals are employed to generate an expanded measurement library. Library based solutions are a common approach to solving the inverse measurement problem that inherent to many semiconductor metrology modalities. However, it is often impractical to generate a measurement library of sufficient span and density based on real measurement data. To overcome this limitation, it is common to generate measurement library data synthetically. Unfortunately, the errors present in the synthetic measurement data are reflected in the resulting measurement library. Thus, it is important to ensure the accuracy of the synthetic measurement data employed to generate a measurement library.

In one example, two different measurement libraries are evaluated to determine the quality of the measurement library. The first library is relatively small, and the second library is relatively large. The second library is generated by extending the parameter range of the first library.

A library based measurement is performed by searching a library for the closest match between input spectra and the spectra stored in the library. The value of the parameter of interest associated with the stored spectra having the closest match with the input spectra is the measured value of the parameter of interest. Measurement bias is evaluated by performing library based measurements from the same input spectra using both libraries, and evaluating the differences between the estimated values of the parameter of interest.

In one example, the relative quality of the libraries is evaluated based on maximum measurement bias. Maximum measurement bias is calculated by taking the maximum value of the difference of values of a parameter of interest estimated by both the original and extended libraries. If the maximum measurement bias is large, the extended library offers a significant performance advantage over the original library. If the maximum measurement bias is small, the extended library does not offer a significant performance advantage.

Figure 8:
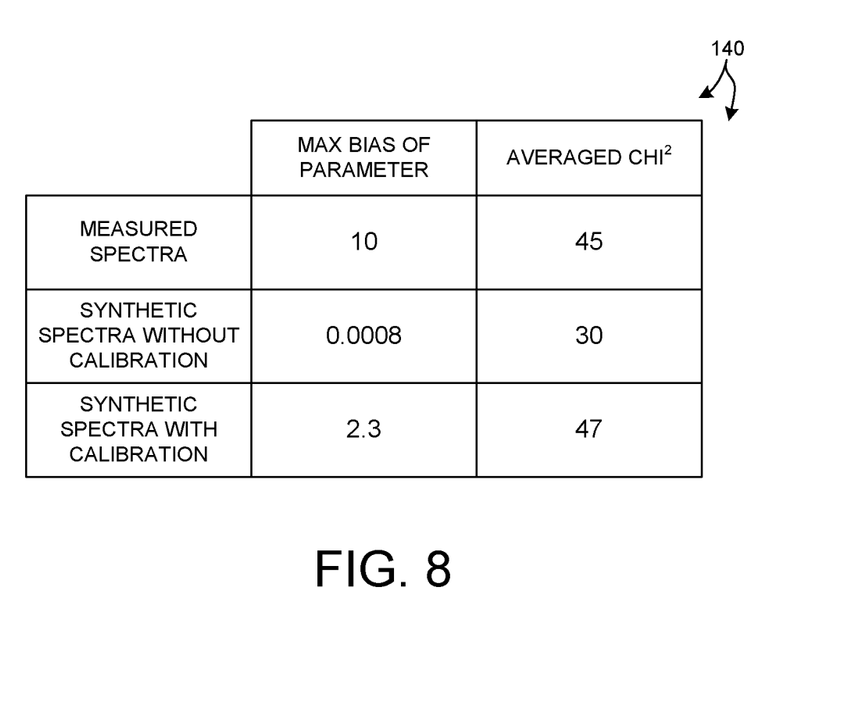
FIG. 8 is a table 140 illustrative of the performance differences between a relatively small library and a relatively large library based on an evaluation of maximum measurement bias using actual measured spectra, uncalibrated, simulated measurement spectra, and calibrated, simulated measurement spectra as input spectra.

FIG. 8 is a table 140 illustrative of the performance differences between a relatively small library and a relatively large library based on an evaluation of maximum measurement bias using actual measured spectra, uncalibrated, simulated measurement spectra, and calibrated, simulated measurement spectra as input spectra.

As depicted in FIG. 8, the maximum bias of a parameter of interest associated with evaluation of the original library and the extended library is 10, when evaluated based on real measured spectra, 0.0008, when evaluated based on uncalibrated, simulated spectra, and 2.3, when evaluated based on calibrated, simulated spectra. These results illustrate that there is a significant performance difference between the two libraries when evaluated using real measured spectra, and this significant performance difference is also captured when the libraries are evaluated using calibrated, simulated spectra. However, this performance difference is not captured when evaluating the libraries based on uncalibrated, simulated data. Thus, calibrated, simulated spectra as described herein can be utilized to evaluate measurement library performance effectively in ways that uncalibrated, simulated spectra cannot.

FIG. 8 also illustrates the goodness of fit of the extended library using actual measured spectra, uncalibrated, simulated measurement spectra, and calibrated, simulated measurement spectra as input spectra. In this example, goodness of fit is quantified as a $CHI^2$ value. Goodness of fit is evaluated based on the residual difference between the input spectra and the library spectra having a closest fit to the input spectra. The residual difference is evaluated for many samples, i.e., 100 different input spectra. The averaged $CHI^2$ value is calculated by averaging the $CHI^2$ values associated each sample. As illustrated in FIG. 8, the averaged $CHI^2$ value is 45, when evaluated based on real measured spectra, 30, when evaluated based on uncalibrated, simulated spectra, and 47, when evaluated based on calibrated, simulated spectra. These results illustrate that the performance of the extended library as characterized by goodness of fit is judged to be similar when evaluated using real measured spectra and calibrated, simulated spectra. However, when evaluated using uncalibrated, simulated spectra, the performance is judged to be better, i.e., lower value of goodness of fit indicates better fit results. This implies that evaluation of a measurement library using uncalibrated, simulated spectra may indicate higher performance than will be realized when the library is employed to perform measurements on actual measurement data. Furthermore, evaluation of a measurement library using real measured spectra and calibrated, simulated spectra indicates a similar level of performance, and in line with the expected performance of the measurement library when employed to perform measurements on actual measurement data. Again, calibrated, simulated spectra as described herein can be utilized to evaluate measurement library performance effectively in ways that uncalibrated, simulated spectra cannot.

Although, the calibration of simulated measurement data is described herein with reference to spectral measurement data generated by a spectroscopic ellipsometry system, i.e., metrology system 100, in general, the calibration techniques described herein can be applied to any semiconductor metrology data employed as part of a model based measurement. Exemplary systems include, but are not limited to optically based spectroscopic measurement systems, such as ellipsometry, reflectometry, and angle resolved reflectometry systems, image based scatterometry measurement systems, such as x-ray based scatterometry measurement systems, etc.

In general, calibrated, simulated measurement signals can be employed measure structural and material characteristics (e.g., material composition, dimensional characteristics of structures and films, etc.) associated with different semiconductor fabrication processes. More specifically, calibrated, simulated measurement signals can be employed as part of a regression on actual measurement data, a library based regression on actual measurement data, measurement library synthesis and evaluation, measurement recipe development, etc.

Figure 9:
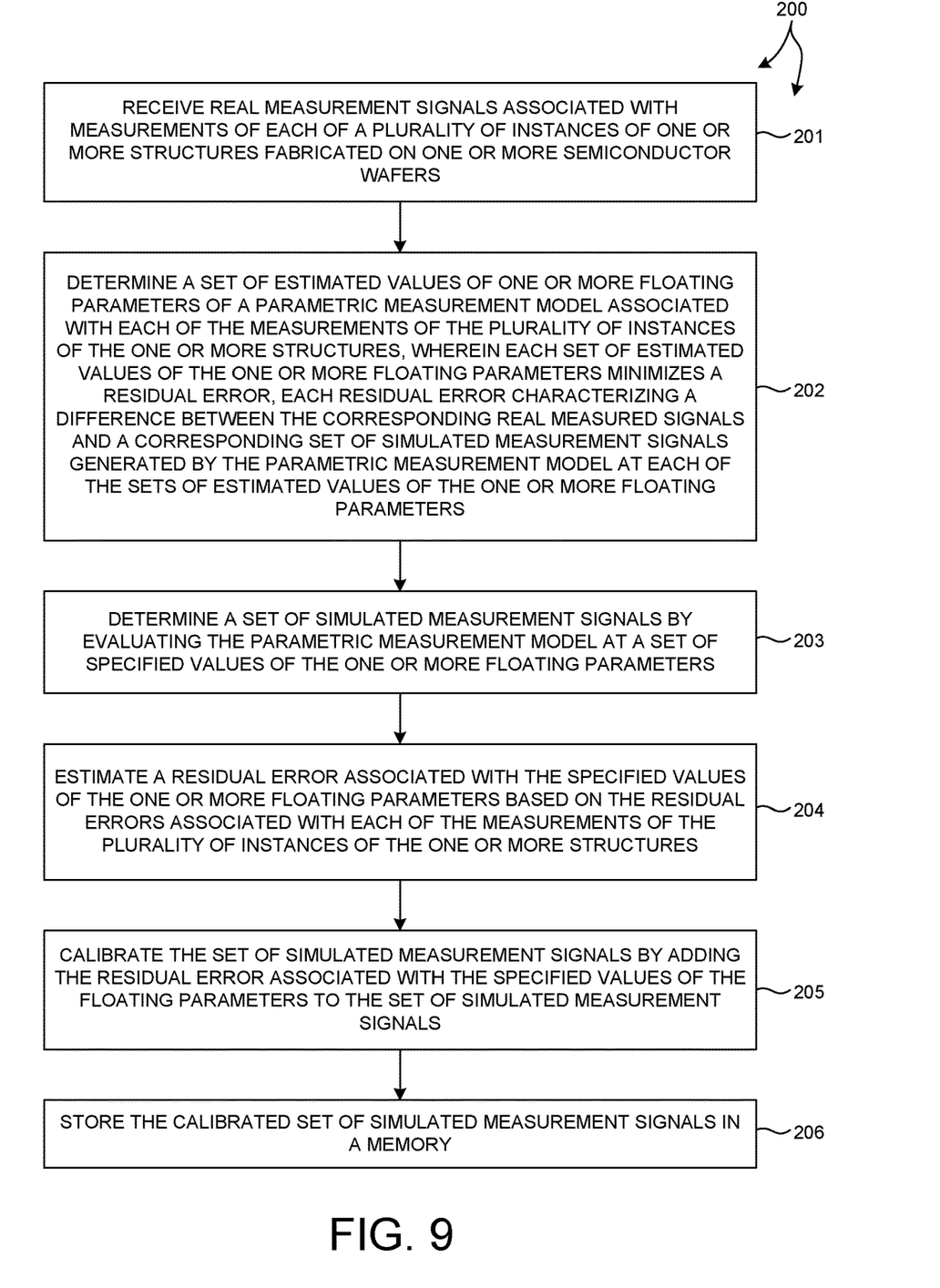
FIG. 9 is a flowchart illustrative of a method 200 of calibrating simulated measurement signals as described herein.

FIG. 9 illustrates a method 200 suitable for implementation by the metrology system 100 of the present invention. In one aspect, it is recognized that data processing blocks of method 200 may be carried out via a pre-programmed algorithm executed by one or more processors of computing system 116. While the following description is presented in the context of metrology system 100, it is recognized herein that the particular structural aspects of metrology system 100 do not represent limitations and should be interpreted as illustrative only.

In block 201, real measurement signals are received by a computing system. The real measurement signals are associated with measurements of each of a plurality of instances of one or more structures fabricated on one or more semiconductor wafers.

In block 202, a set of estimated values of one or more floating parameters of a parametric measurement model is determined. The set of estimated values is associated with each of the measurements of the plurality of instances of the one or more structures. Each set of estimated values of the one or more floating parameters minimizes a residual error. Each residual error characterizes a difference between the corresponding real measured signals and a corresponding set of simulated measurement signals generated by the parametric measurement model at each of the sets of estimated values of the one or more floating parameters.

In block 203, a set of simulated measurement signals is determined by evaluating the parametric measurement model at a set of specified values of the one or more floating parameters.

In block 204, a residual error associated with the specified values of the one or more floating parameters is estimated based on the residual errors associated with each of the measurements of the plurality of instances of the one or more structures.

In block 205, the set of simulated measurement signals is calibrated by adding the residual error associated with the specified values of the floating parameters to the set of simulated measurement signals.

In block 206, the calibrated set of simulated measurement signals in a memory, e.g., carrier medium 118.

As discussed hereinbefore, there is no requirement that the measurement data acquisition and the subsequent analysis of the measurement data as described herein need be contemporaneous or performed in spatial proximity. For instance, measurement data may be stored in memory for analysis at a later time. In another instance, measurement data may be obtained and transmitted to a computing system located at a remote location for analysis.

In some examples, the indications of the measured spectral response are $\alpha_{meas}$ and $\beta_{meas}$ values derived from measurement data by methods known in the art as discussed hereinbefore with reference to equations (1)-(3). In other examples, other indications of the measured spectral response may be contemplated (e.g., tan $\Psi$ and $\Delta$, etc.). The aforementioned spectral response indications are provided by way of non-limiting example. Other indications or combinations of indications may be contemplated. It is important to note that a spectral indication is based on the spectral response of the specimen, not specific metrics (e.g., film thickness, index of refraction, dielectric constants, etc.) that may be derived from the spectral response of the specimen.

In yet another aspect, the measurement results described herein can be used to provide active feedback to a process tool (e.g., lithography tool, etch tool, deposition tool, etc.). For example, values of measured parameters determined based on measurement methods described herein can be communicated to a lithography tool to adjust the lithography system to achieve a desired output. In a similar way etch parameters (e.g., etch time, diffusivity, etc.) or deposition parameters (e.g., time, concentration, etc.) may be included in a measurement model to provide active feedback to etch tools or deposition tools, respectively. In some example, corrections to process parameters determined based on measured device parameter values and a trained measurement model may be communicated to a lithography tool, etch tool, or deposition tool.

Metrology systems configured to measure geometry and material properties of dielectric and metallic films and structures may employ the methods described herein. Such measurements include, by way of non-limiting example, film properties and dimensions, CD, overlay, and composition measurements. Such metrology systems may include any number of illumination sources, including, but not limited to lamps, lasers, laser driven sources, x-ray sources and EUV sources. Such metrology systems may employ an number of measurement technologies, including, but not limited to all implementations of ellipsometers (including broadband spectroscopic or single wavelength, single- or multi-angle, or angle-resolved, with fixed or rotating polarizers and compensators), all implementations of reflectometers (including spectroscopic or single wavelength, single- or multi-angle, or angle-resolved), differential measurements, such as interferometers, and x-ray based metrologies.

As described herein, the term "metrology system" includes any system employed at least in part to characterize a specimen in any aspect. Exemplary terms used in the art may include a "defect inspection" system or an "inspection" system. However, such terms of art do not limit the scope of the term "metrology system" as described herein. In addition, the metrology systems 100 and 400 may be configured for inspection of patterned wafers and/or unpatterned wafers. The metrology systems may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on differences in error spectra between a reference and a target metrology tool.

Various embodiments are described herein for a semiconductor processing system (e.g., a metrology system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate.

One or more layers may be formed upon a wafer. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed.

One or more layers formed on a wafer may be "patterned" or "unpatterned." For example, a wafer may include a plurality of dies having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

A typical semiconductor process includes wafer processing by lot. As used herein a "lot" is a group of wafers (e.g., group of 25 wafers) which are processed together. Each wafer in the lot is comprised of many exposure fields from lithography processing tools (e.g. steppers, scanners, etc.). Within each field may exist multiple die. A die is the functional unit which eventually becomes a single chip. One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
receiving real measurement signals associated with measurements of each of a plurality of instances of one or more structures fabricated on one or more semiconductor wafers;
determining a set of estimated values of one or more floating parameters of a parametric measurement model associated with each of the measurements of the plurality of instances of the one or more structures, wherein each set of estimated values of the one or more floating parameters minimizes a residual error, each residual error characterizing a difference between the corresponding real measured signals and a corresponding set of simulated measurement signals generated by the parametric measurement model at each of the sets of estimated values of the one or more floating parameters;
determining a set of simulated measurement signals by evaluating the parametric measurement model at a set of specified values of the one or more floating parameters;
estimating a residual error associated with the specified values of the one or more floating parameters based on the residual errors associated with each of the measurements of the plurality of instances of the one or more structures;
calibrating the set of simulated measurement signals by adding the residual error associated with the specified values of the floating parameters to the set of simulated measurement signals;
receiving real measurement signals associated with a measurement of another instance of the one or more structures;
estimating a value of a parameter of interest characterizing the one or more structures based on the real measurement signals associated with the measurement of another instance of the one or more structures and the calibrated set of simulated measurement signals; and
communicating an indication of the estimated value of the parameter of interest to a semiconductor fabrication tool that causes the semiconductor fabrication tool to adjust one or more parameters of a fabrication process of the semiconductor fabrication tool to achieve a desired output from the semiconductor fabrication tool.

2. The method of claim 1, wherein the one or more semiconductor wafers are inline, production wafers.

3. The method of claim 1, wherein the measurements of each of a plurality of instances of one or more structures fabricated on one or more semiconductor wafers are optically based spectroscopic measurements or image based scatterometry measurements.

4. The method of claim 1, further comprising:
determining a variation of values of each of the one or more floating parameters of the parametric measurement model across the sets of estimated values of the one or more floating parameters of the parametric measurement model associated with the measurements of the plurality of instances of the one or more structures.

5. The method of claim 4, further comprising:
generating an expanded set of values of each of the one or more floating parameters based on the determined variations, wherein each expanded set of values is larger than the corresponding set of estimated values.

6. The method of claim 5, further comprising:
generating an expanded set of simulated measurement signals by evaluating the parametric measurement model at each of the values of the expanded set of values of each of the one or more floating parameters.

7. The method of claim 1, wherein the estimating of the residual error associated with the specified values of the one or more floating parameters involves:
selecting one or more sets of real measurement signals that most closely match the set of simulated measurement signals corresponding to the specified values of the one or more floating parameters; and
estimating the residual error associated with the specified values of the one or more floating parameters based on the residual errors corresponding to the one or more selected sets of real measurement signals.

8. The method of claim 7, wherein the selecting of the one or more sets of real measurement signals that most closely match the set of simulated measurement signals involves a K-nearest neighbor search of the sets of real measurement signals.

9. The method of claim 1, wherein the estimating of the residual error associated with the specified values of the one or more floating parameters involves:
generating a statistical model of the residual errors characterizing the difference between the corresponding real measured signals and the corresponding set of simulated measurement signals as a function of values of the real measurement signals; and
evaluating the statistical model at the set of simulated measurement signals associated with the specified values of the one or more floating parameters to determine the residual error associated with the specified values of the one or more floating parameters.

10. A metrology system comprising:
an illumination source configured to generate an amount of illumination light directed to one or more structures fabricated on a semiconductor wafer;
a detector configured to detect an amount of light from the one or more structures in response to the amount of illumination light and generate real measurement signals indicative of the detected light; and
one or more computer systems configured to:
receive real measurement signals associated with measurements of each of a plurality of instances of the one or more structures fabricated on one or more semiconductor wafers;
determine a set of estimated values of one or more floating parameters of a parametric measurement model associated with each of the measurements of the plurality of instances of the one or more structures, wherein each set of estimated values of the one or more floating parameters minimizes a residual error, each residual error characterizing a difference between the corresponding real measured signals and a corresponding set of simulated measurement signals generated by the parametric measurement model at each of the sets of estimated values of the one or more floating parameters;

determine a set of simulated measurement signals by
evaluating the parametric measurement model at a
set of specified values of the one or more floating
parameters;
estimate a residual error associated with the specified
values of the one or more floating parameters based
on the residual errors associated with each of the
measurements of the plurality of instances of the one
or more structures;
calibrate the set of simulated measurement signals by
adding the residual error associated with the specified values of the floating parameters to the set of
simulated measurement signals;
receive real measurement signals associated with a
measurement of another instance of the one or more
structures;
estimate a value of a parameter of interest characterizing the one or more structures based on the real
measurement signals associated with the measurement of another instance of the one or more structures and the calibrated set of simulated measurement signals; and
communicate an indication of the estimated value of
the parameter of interest to a semiconductor fabrication tool that causes the semiconductor fabrication
tool to adjust one or more parameters of a fabrication
process of the semiconductor fabrication tool to
achieve a desired output from the semiconductor
fabrication tool.

11. The metrology system of claim 10, wherein the one or more semiconductor wafers are inline, production wafers.

12. The metrology system of claim 10, wherein the measurements of each of a plurality of instances of one or more structures fabricated on one or more semiconductor wafers are optically based spectroscopic measurements or image based scatterometry measurements.

13. The metrology system of claim 10, the one or more computing systems further configured to:
determine a variation of values of each of the one or more
floating parameters of the parametric measurement
model across the sets of estimated values of the one or
more floating parameters of the parametric measurement model associated with the measurements of the
plurality of instances of the one or more structures.

14. The metrology system of claim 13, the one or more computing systems further configured to:
generate an expanded set of values of each of the one or
more floating parameters based on the determined
variations, wherein each expanded set of values is
larger than the corresponding set of estimated values.

15. The metrology system of claim 14, the one or more computing systems further configured to:
generate an expanded set of simulated measurement signals by evaluating the parametric measurement model
at each of the values of the expanded set of values of
each of the one or more floating parameters.

16. The metrology system of claim 10, wherein the estimating of the residual error associated with the specified values of the one or more floating parameters involves:
selecting one or more sets of real measurement signals
that most closely match the set of simulated measurement signals corresponding to the specified values of
the one or more floating parameters; and
estimating the residual error associated with the specified
values of the one or more floating parameters based on
the residual errors corresponding to the one or more
selected sets of real measurement signals.

17. The metrology system of claim 16, wherein the selecting of the one or more sets of real measurement signals that most closely match the set of simulated measurement signals involves a K-nearest neighbor search of the sets of real measurement signals.

18. The metrology system of claim 10, wherein the estimating of the residual error associated with the specified values of the one or more floating parameters involves:
generating a statistical model of the residual errors characterizing the difference between the corresponding
real measured signals and the corresponding set of
simulated measurement signals as a function of values
of the real measurement signals; and
evaluating the statistical model at the set of simulated
measurement signals associated with the specified values of the one or more floating parameters to determine
the residual error associated with the specified values of
the one or more floating parameters.

19. A metrology system comprising:
an illumination source configured to generate an amount
of illumination light directed to one or more structures
fabricated on a semiconductor wafer;
a detector configured to detect an amount of light from the
one or more structures in response to the amount of
illumination light and generate real measurement signals indicative of the detected light; and
a non-transitory, computer-readable medium storing
instructions that, when executed by one or more processors, causes the one or more processors to:
receive real measurement signals associated with measurements of each of a plurality of instances of the
one or more structures fabricated on one or more
semiconductor wafers;
determine a set of estimated values of one or more
floating parameters of a parametric measurement
model associated with each of the measurements of
the plurality of instances of the one or more structures, wherein each set of estimated values of the one
or more floating parameters minimizes a residual
error, each residual error characterizing a difference
between the corresponding real measured signals
and a corresponding set of simulated measurement
signals generated by the parametric measurement
model at each of the sets of estimated values of the
one or more floating parameters;
determine a set of simulated measurement signals by
evaluating the parametric measurement model at a
set of specified values of the one or more floating
parameters;
estimate a residual error associated with the specified
values of the one or more floating parameters based
on the residual errors associated with each of the
measurements of the plurality of instances of the one
or more structures;
calibrate the set of simulated measurement signals by
adding the residual error associated with the specified values of the floating parameters to the set of
simulated measurement signals;
receive real measurement signals associated with a
measurement of another instance of the one or more
structures;
estimating a value of a parameter of interest characterizing the one or more structures based on the real
measurement signals associated with the measurement of another instance of the one or more structures and the calibrated set of simulated measurement signals; and communicate an indication of the estimated value of the parameter of interest to a semiconductor fabrication tool that causes the semiconductor fabrication tool to adjust one or more parameters of a fabrication process of the semiconductor fabrication tool to achieve a desired output from the semiconductor fabrication tool.

20. The metrology system of claim 19, wherein the one or more semiconductor wafers are inline, production wafers, and wherein the measurements of each of a plurality of instances of one or more structures fabricated on one or more semiconductor wafers are optically based spectroscopic measurements or image based scatterometry measurements.

* * * * *